(12) United States Patent
Chen et al.

(10) Patent No.: US 10,578,445 B2
(45) Date of Patent: Mar. 3, 2020

(54) METHOD AND APPARATUS FOR BUILDING AN ITINERARY-PLANNING MODEL AND PLANNING A TRAVELING ITINERARY

(71) Applicant: BEIJING BAIDU NETCOM SCIENCE AND TECHNOLOGY CO., LTD., Haidian District, Beijing (CN)

(72) Inventors: Mengting Chen, Beijing (CN); Huasheng Liang, Beijing (CN); Fan Wang, Beijing (CN); Bo Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/008,639

(22) Filed: Jun. 14, 2018

(65) Prior Publication Data
US 2018/0364054 A1 Dec. 20, 2018

(30) Foreign Application Priority Data
Jun. 15, 2017 (CN) .......................... 2017 1 0452638

(51) Int. Cl.
*G01C 21/34* (2006.01)
*G06N 3/02* (2006.01)
(Continued)

(52) U.S. Cl.
CPC ....... *G01C 21/343* (2013.01); *G01C 21/3476* (2013.01); *G01C 21/3492* (2013.01);
(Continued)

(58) Field of Classification Search
None
See application file for complete search history.

(56) References Cited

U.S. PATENT DOCUMENTS

| 10,332,039 B2 * | 6/2019 | Gonzalez | G06Q 50/14 |
| 2016/0202076 A1 * | 7/2016 | Feng | G01C 21/343 |
| | | | 701/408 |
| 2017/0032480 A1 * | 2/2017 | Wong | G06Q 50/14 |

OTHER PUBLICATIONS

Chiang et al., "User-adapted travel planning system for personalized schedule recommendation", Department of Information Management, National Taichung University of Science and Technology, No. 129, Sec. 3, Taiwan, Jun. 11, 2013, p. 5 (Year: 2013).*

(Continued)

*Primary Examiner* — Tamara L Weber
(74) *Attorney, Agent, or Firm* — Brooks Kushman PC

(57) ABSTRACT

The present disclosure provides a method and apparatus for building an itinerary-planning model and planning a traveling itinerary, wherein the method for building the itinerary-planning model comprises: obtaining a travel route with a known travel demand; training a deep learning model by regarding the travel demand, a set of candidate scenic spots determined by using the travel demand and the travel route corresponding to the travel demand as training samples, to obtain the itinerary-planning model; the itinerary-planning model is configured to use the travel demand to obtain a corresponding travel route. The method of planning a travelling itinerary comprises: obtaining the user's travel demand; according to the user's travel demand, obtaining a set of candidate scenic spots corresponding to the travel demand; inputting the user's travel demand and the set of candidate scenic spots into an itinerary-planning model, to obtain a travel route obtained by the itinerary-planning model.

21 Claims, 4 Drawing Sheets

(51) Int. Cl.
  *G01C 21/36* (2006.01)
  *G06Q 10/06* (2012.01)
  *G06N 3/04* (2006.01)
  *G06N 3/00* (2006.01)
  *G06N 3/08* (2006.01)
  *G06N 5/02* (2006.01)

(52) U.S. Cl.
  CPC ......... *G01C 21/3605* (2013.01); *G06N 3/006* (2013.01); *G06N 3/02* (2013.01); *G06N 3/0454* (2013.01); *G06N 3/08* (2013.01); *G06Q 10/06* (2013.01); *G06N 5/022* (2013.01)

(56) References Cited

OTHER PUBLICATIONS

Bhowmick et al., "A Temporal Constraint based Planning Approach for City Tour and Travel Plan Generation", 2012, IEEE Proceedings of 4th International Conference on Intelligent Human Computer Interaction, p. 1-6 (Year: 2012).*

Anonymous, "Method for Travel Plan based on Social Network Contribution and Sentiment Analysis", 2014, ip.com No. IPCOM000239535D, p. 1-3 (Year: 2014).*

* cited by examiner

Display of travel route

Two-day travel in Beijing. Theme: culture and arts

Day 1

Depart from hotel--8:00 Imperial Palace→restaurant: Grandma's Diet (located at Beijing apm) →12:25 Jingshan Park→14:39 National Art Museum of China→18:05 Monument to the People's Heroes→return to hotel

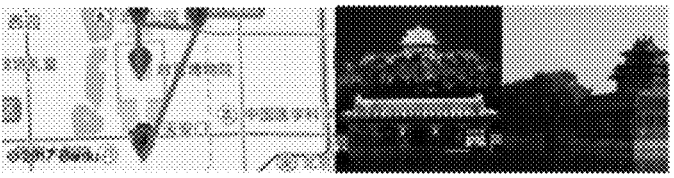

Day 2

Depart from hotel-- 8:00 Chairman Mao's Memorial Hall→10:05 the Great Hall of the People→restaurant: Charme (located Joy City) →12:05 the National Grand Theater→14:05 Tian'anmen Square →16:05Tian'anmen→18:05return to hotel

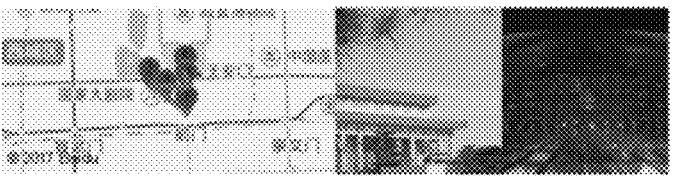

Fig. 3

Fig. 4

METHOD AND APPARATUS FOR BUILDING AN ITINERARY-PLANNING MODEL AND PLANNING A TRAVELING ITINERARY The present application claims the priority of Chinese Patent Application No. 2017104526382, filed on Jun. 15, 2017, with the title of "Method and apparatus for building an itinerary-planning model and planning a traveling itinerary". The disclosure of the above applications is incorporated herein by reference in its entirety.

FIELD OF THE DISCLOSURE

The present disclosure relates to the technical field of the Internet, and particularly to a method and apparatus for building an itinerary-planning model and planning a traveling itinerary.

BACKGROUND OF THE DISCLOSURE

Self-service travel means that a traveler, upon performing travel activities, partially depends on or totally does not depend on arrangements of travel brokers, does not require any tourist guide's accompaniment, and finally completes travel activities selected and arranged by the traveler on his own. Hence, self-service travel is a new option and a new trend for many travel enthusiasts, and more people will choose the self-service travel as a travelling manner in the future. However, as life rhythm quickens and travelers cannot thoroughly understand scenic spots of the travel destination, travelers need to spend a lot of time in investigating and planning a reasonable travelling itinerary. This is very challenging for ordinary travelers.

In the prior art, the following manner is employed to plan the travelling itinerary: obtain the user's travel demand, and return optional scenic spots meeting the user's travel demands for selection by the user; after the user reviews detailed information of the scenic spots, he selects satisfactory scenic spots and adds them to the travel route and then plans a travelling order according to the distances of scenic spots. Therefore, in the prior art, there are more human-machine interaction steps, operations are complicated and require time costs, and it is impossible to really smartly perform personalized customization of a travelling itinerary according to the user's travel demands. Therefore, how to smartly perform personalized customization of a travelling itinerary according to the user's actual travel demands is a problem urgently to be solved.

SUMMARY OF THE DISCLOSURE

In view of the above, the present disclosure provides a method and apparatus for building an itinerary-planning model and planning a traveling itinerary, to smartly plan a travel route according to the user's travel demand.

A technical solution employed by the present disclosure to solve the technical problem is providing a method for building an itinerary-planning model. The method comprises: obtaining a travel route with a known travel demand; training a deep learning model by regarding the travel demand, a set of candidate scenic spots determined by using the travel demand and the travel route corresponding to the travel demand as training samples, to obtain the itinerary-planning model; the itinerary-planning model is configured to use the travel demand to obtain a corresponding travel route.

According to a preferred embodiment of the present disclosure, the method further comprises: a training target of the deep learning model is to maximize a feedback value of the deep learning model; the feedback value is a score obtained by using a route estimating model to estimate the travel route obtained by the deep learning model.

According to a preferred embodiment of the present disclosure, the determining the set of candidate scenic spots by using the travel demand comprises: according to the obtained travel demand, determining candidate scenic spots meeting the travel demand; according to heat and scores of the candidate scenic spots, forming the set of candidate scenic spots with candidate scenic spots meeting preset requirements.

According to a preferred embodiment of the present disclosure, the candidate scenic spots include scenic spot attribute information, and the scenic spot attribute information comprises at least one of scenic spot location information, scenic spot theme information, and information about travel time at the scenic spot.

According to a preferred embodiment of the present disclosure, the regarding the travel demand, a set of candidate scenic spots determined by using the travel demand and the travel route corresponding to the travel demand as training samples comprises: building a travel information graph by using the travel demand and the set of candidate scenic spots; regarding the travel demand, the travel information graph and the travel route as training samples.

According to a preferred embodiment of the present disclosure, the travel information graph includes at least one of a scenic spot location information graph, an information graph about whether scenic spots are sightseen, and an overlapping information graph of scenic spots at the same location.

According to a preferred embodiment of the present disclosure, the travel demand comprises at least one of a travel destination, a travel comfort degree, a number of travelling days and a travel theme.

According to a preferred embodiment of the present disclosure, the route estimating model is built in the following manner: obtaining travel routes with known estimation scores and travel demands; training a regression model by regarding route features and travel demand features of the travel routes and the estimation scores as training samples, to obtain the route estimating model; the route estimating mode is configured to estimate the travel route according to the travel demand.

According to a preferred embodiment of the present disclosure, the method further comprises: a training target of the regression model is to minimize a regression price of the regression model; the regression price is a root mean square error between a score obtained by the regression model and corresponding to the travel route and a known estimation score of the travel route.

According to a preferred embodiment of the present disclosure, the route features of the travel route comprise at least one of a route theme, route heat, travel time of the route or a distance of the route.

According to a preferred embodiment of the present disclosure, the deep learning model is a deep reinforcement learning model.

According to a preferred embodiment of the present disclosure, the regression model is a linear regression model.

A technical solution employed by the present disclosure to solve the technical problem is providing an apparatus for building an itinerary-planning model. The apparatus comprises: a first obtaining unit configured to obtain a travel route with a known travel demand; a first training unit configured to train a deep learning model by regarding the travel demand, a set of candidate scenic spots determined by using the travel demand and the travel route corresponding to the travel demand as training samples, to obtain an itinerary-planning model; the itinerary-planning model is configured to use the travel demand to obtain a corresponding travel route.

According to a preferred embodiment of the present disclosure, the apparatus further comprises: a first updating unit configured to make it a training target of the deep learning model to maximize a feedback value of the deep learning model; the feedback value is a score obtained by using a route estimating model to estimate the travel route obtained by the deep learning model.

According to a preferred embodiment of the present disclosure, the first training unit, upon determining the set of candidate scenic spots by using the travel demand, specifically executes: determining candidate scenic spots meeting the travel demand according to the travel demand; according to heat and scores of the candidate scenic spots, forming the set of candidate scenic spots with candidate scenic spots meeting preset requirements.

According to a preferred embodiment of the present disclosure, the first training unit, upon using the travel demand, the set of candidate scenic spots determined by using the travel demand and the travel route corresponding to the travel demand as training samples, specifically executes: building a travel information graph by using the travel demand and the set of candidate scenic spots; regarding the travel demand, the travel information graph and the travel route as training samples.

According to a preferred embodiment of the present disclosure, the travel demand comprises at least one of a travel destination, a travel comfort degree, a number of travelling days and a travel theme.

According to a preferred embodiment of the present disclosure, the apparatus further comprises: a second training unit configured to build a route estimating model in the following manner: obtaining travel routes with known estimation scores and travel demands; training a regression model by regarding route features and travel demand features of the travel routes and the estimation scores as training samples, to obtain the route estimating model; the route estimating mode is configured to estimate the travel route according to the travel demand.

According to a preferred embodiment of the present disclosure, the apparatus further comprises: a second updating unit configured to make it a training target of the regression model to minimize a regression price of the regression model; the regression price is a root mean square error between a score obtained by the regression model and corresponding to the travel route and a known estimation score of the travel route.

According to a preferred embodiment of the present disclosure, the route features of the travel route comprise at least one of a route theme, route heat, travel time of the route or a distance of the route.

A technical solution employed by the present disclosure to solve the technical problem is providing a method of planning a travelling itinerary. The method comprises: obtaining the user's travel demand; according to the user's travel demand, obtaining a set of candidate scenic spots corresponding to the travel demand; inputting the user's travel demand and the set of candidate scenic spots into the itinerary-planning model, to obtain a travel route obtained by the itinerary-planning model.

A technical solution employed by the present disclosure to solve the technical problem is providing an apparatus of planning a travelling itinerary. The apparatus comprises: a second obtaining unit configured to obtain the user's travel demand; a third obtaining unit configured to, according to the user's travel demand, obtain a set of candidate scenic spots corresponding to the travel demand; a planning unit configured to input the user's travel demand and the set of candidate scenic spots into the itinerary-planning model, to obtain a travel route obtained by the itinerary-planning model.

As can be seen from the above technical solutions of the present disclosure, it is possible to, through the pre-built itinerary-planning model, input the obtained user's travel demand, then smartly plan the travel route meeting the user's travel demand, thereby reduce the time spent by the user in planning the travelling itinerary, and improve the user's efficiency of planning the travelling itinerary.

BRIEF DESCRIPTION OF DRAWINGS

FIG. 3 is a schematic diagram of a travel route according to an embodiment of the present disclosure;

FIG. 4 is a schematic diagram of introduction of a scenic spot according to an embodiment of the present disclosure;

DETAILED DESCRIPTION OF PREFERRED EMBODIMENTS

Figure 1:
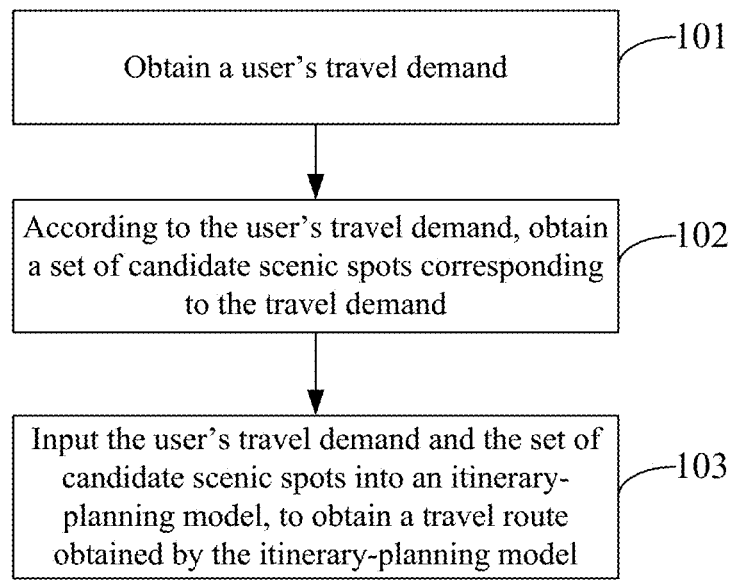
FIG. 1 is a flow chart of a method of planning a travelling itinerary according to an embodiment of the present disclosure.

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined"

or "responsive to determining" or "when (stated condition or event) is detected" or "responsive to detecting (stated condition or event)".

When a traveling itinerary is planned in the prior art, the user still needs to select scenic spots satisfying the travel demands, to generate a corresponding travel itinerary. Therefore, the manner of generating the travelling itinerary in the prior art has problems such as complicated planning steps, longer planning time and a low planning efficiency. However, the present disclosure provides a method and apparatus for building an itinerary-planning model and planning a traveling itinerary. After the obtained user's travel demands are input into a pre-built itinerary-planning model, a travelling itinerary meeting the user's travel demands can be generated smartly, thereby reducing the time spent by the user in planning the travelling itinerary and improving the travelling itinerary-planning efficiency.

First, a method of building the itinerary-planning model is described. In the present disclosure, the itinerary-planning model is a deep learning model, preferably a Deep Deterministic Policy Gradients (DDPG) model. During the building of the itinerary-planning model, a route estimating model needs to be built. In the present disclosure, the route estimating model is a regression model, preferably a linear regression model.

Specifically, the route estimating model may be pre-built in the following manner:

First, obtaining travel routes with known estimation scores and travel demands. The known estimation scores of the travel routes may be manually calibrated, or the known estimation scores of the travel routes may be automatically calibrated by using for example a deep learning method. In the present embodiment, the known estimation scores corresponding to the travel routes are at five levels, namely, level 0, level 1, level 2, level 3 and level 4. Level 0 to level 4 indicate that quality of the travel routes gets better in turn.

Then, extracting route features and travel demand features of the travel routes, and cascading the extracted route features and travel demands, and inputting cascaded features into the regression model. An output result obtained by the regression model according to the input cascaded features is a score corresponding to the travel route. The route features of the travel route comprise at least one of a route theme, route heat, travel time of the route or a distance of the route; the travel demand features comprise at least one of a travel destination, a travel comfort degree, a number of travelling days and a travel theme.

After obtaining the score of the corresponding travel route, the regression model calculates a regression price, for example, calculates a root mean square error between the obtained score and the known estimation score of the travel route, and regards the root mean square error as the regression price. Parameters in the regression model are adjusted according to the obtained root mean square error, in order to minimize the root mean square error. In embodiments of the present disclosure, the regression price is used constantly to adjust the parameters in the regression model until when the root mean square obtained from the calculation meets a preset convergence requirement, it may be believed that the minimization requirement of the regression price is reached, adjustment of the parameters of the regression model is completed, and the route estimating model is obtained. The preset convergence requirement may include: the root mean square errors obtained within preset times are equal, or a difference between the root mean square errors obtained within preset times is smaller than or equal to a preset threshold. The route estimating model is obtained upon completion of the training of the regression model. The route estimating model can estimate the travel route according to the travel demands.

Specifically, the itinerary-planning model may be pre-built by employing the following steps:

(1) obtaining a travel route with a known travel demand;

(2) training a deep learning model by regarding the user's travel demand, a set of candidate scenic spots corresponding to the travel demand and the travel route corresponding to the travel demand as training samples;

(3) obtaining the itinerary-planning model when a feedback value obtained by the deep learning model is a maximum.

The above steps will be described below in detail:

(1) Obtaining a travel route with a known travel demand

In the step, the travel route with the known travel demand is obtained from a database. The travel demand comprises at least one of a travel destination, a travel comfort degree, a number of travelling days and a travel theme. For example, the travel route: the Imperial Palace→Tian'anmen→the Great Hall of the People is obtained from the database, the travel demand corresponding to the travel route may be: the travel destination is Beijing, the travel them is history and culture, and the number of travelling days is one day.

(2) Training a deep learning model by regarding the user's travel demand, a set of candidate scenic spots corresponding to the travel demand and the travel route corresponding to the travel demand as training samples.

In this step, first, the set of candidate scenic spots corresponding to the travel demand is determined according to the obtained travel demand. Determining the set of candidate scenic spots corresponding to the travel demand comprises: determining candidate scenic spots meeting the travel demand according to the travel demand; according to heat and scores of the candidate scenic spots, forming the set of candidate scenic spots with candidate scenic spots meeting preset requirements. Upon determining candidate scenic spots meeting the travel demand according to the travel demand, it is feasible to match the travel demand with scenic spot attribute information in a scenic spot database, to obtain scenic spots meeting the travel demand as candidate scenic spots. In the scenic spot database, the scenic spot attribute information may include but not limited to: location information of the scenic spot, theme information of the scenic spot, and information about suitable travel time. Hence, the candidate scenic spots meeting the travel demand may be determined according to the obtained travel demand.

Forming the set of candidate scenic spots with candidate scenic spots meeting preset requirements may be forming the set of candidate scenic spots with candidate scenic spots whose heat or scores exceeds a preset threshold; or forming the set of candidate scenic spots with candidate scenic spots whose heat or scores rank top N, wherein N is an integer; or forming the set of candidate scenic spots with those candidate scenic spots who meet preset requirements after heat and scores of candidate scenic spots are considered comprehensively. It may be appreciated that in the present disclosure, the scenic spot database may pre-include heat information and score information corresponding to scenic spots. It is also feasible to obtain heat information and score information corresponding to scenic spots in other ways, for example, obtain the heat information and score information corresponding to scenic spots from a commentary-type server. For example, if the obtained user's travel demand is: the travel destination is Beijing and the travel them is history and culture, the obtained candidate scenic spots are cultural scenic spots located in Beijing such as the Imperial Palace, the Great Wall and the National Grand Theater. If the Great Wall in the candidate scenic spots has a lower heat or score, only the Imperial Palace and the National Grand Theater are used to form the set of candidate scenic spots corresponding to the user's travel demand.

Optionally, in a specific implementation mode of the present embodiment, the set of candidate scenic spots may further be obtained in the following manner: according to the travel destination in the user's travel demand, determining the set of candidate scenic spots corresponding to the travel destination, and recording the set as a candidate set of scenic spots of the travel destination; then according to a travel theme in the user's travel demand, determining a set of candidate scenic spots corresponding to the travel them, and recording the set as a candidate set of initial travel scenic spots. Scenic spots in the set of initial travel scenic spots as starting scenic spots, and then other scenic spots are selected from the candidate set of scenic spots of the travel destination, to generate the travel route.

After the set of candidate scenic spots is obtained, a travel information graph is built by using the travel demand and the set of candidate scenic spots, wherein the travel information graph includes at least one of a scenic spot location information graph, an information graph about whether scenic spots are sightseen, and an overlapping information graph of scenic spots at the same location. The travel information included by different travel information graphs is different. For example, the scenic spot location information graph includes locational or coordinate information of scenic spots; the information graph about whether scenic spots are sightseen includes information about whether the scenic spots are already sightseen.

Finally, the deep model is trained by using the travel demand, the travel information graph and the travel route as training samples, to obtain the itinerary-planning model.

Wherein a process of training the deep learning model is in fact a self-learning process of the deep learning model. The principle of self-learning of the deep learning model is described below:

After the building of the travel information graph is completed, the deep learning model performs convolution for the built travel information graph so as to extract features in the travel information graph.

Then, the deep learning model then extracts route features of a travel route from an initial travel scenic spot to a current travel scenic spot, and cascades the extracted route features with a convolution result of the travel information graph, as an input of a fully-connected layer of the deep learning model. However, an output of the fully-connected layer of the deep learning model is a coordinate of next possible travel scenic spot. Since generation of the travel route with the deep learning model used in the present disclosure is completed selecting suitable candidate scenic spots step by step in the set of candidate scenic spots, the deep learning model needs to constantly select next suitable candidate scenic spot according to the already-generated route, to generate a complete travel route, and stop selection until the generated travel route satisfies the user's travel demand.

After obtaining the coordinate of next possible travel scenic spot, the deep learning model inputs coordinates of candidate scenic spots via a neural network, and then selects next travel scenic spot according to an output result of the neural network. For example, the used neural network is a convolutional neural network Q-network, Q values obtained by calculating by the Q-network according to coordinates of candidate scenic spots are output results corresponding to coordinates of respective candidate scenic spots, and a candidate scenic spot corresponding to the coordinate with a maximum Q value is selected therefrom as next travel scenic spot. After selecting next travel scenic spot, the deep learning model updates the travel information graph about whether scenic spots are sightseen among the travel information graphs. A purpose of executing the process is filtering already-selected candidate scenic spots from the set of travel candidate scenic spots.

The deep learning model repeats the above step until the travel time of scenic spots in the generated travel route meets the user travel demand, i.e., the generated route is regarded as a complete travel route after a sum of travel time of scenic spots in the generated travel route satisfies the travel time of each traveling day of the user. For example, if the travel comfort degree in the user's travel demand is deep travel, which means that the user's travel time each day is 10-12 hours, if the route currently generated by the deep learning model is: the Imperial Palace→Tian'anmen Sqaure→the Great Hall of the People, if the travel time in the Imperial Palance is 3 hours, the travel time on Tian'anmen Square is 2 hours and the travel time in the Great Hall of the People is 2 hours, the sum of travel time at scenic spots of the current travel route is 7 hours, the deep learning model continues generation of the travel route. When the route generated by the deep learning model is the Imperial Palace→Tian'anmen Sqaure→the Great Hall of the People→the National Grand Theater and if the travel time in the National Grand Theater is 3 hours, the sum of travel time at scenic spots of the current travel route is 10 hours, this satisfies the requirement for the travel time of 10-12 hours in the user's travel demand, and the deep learning model completes the generation of the travel route.

(3) Obtaining the itinerary-planning model when a feedback value obtained by the deep learning model is a maximum.

In this step, the deep learning model extracts the route features and travel demand features corresponding to the generated travel route, and inputs a cascading result of the two into the route estimating model. The route estimating model outputs a score corresponding to the travel route according to the input cascading result. The route estimating model, after obtaining the score corresponding to the travel route, feeds back the obtained score to the deep learning model as a feedback value. The deep learning model updates the parameters of the neural network according to the feedback value. When the deep learning model generates the travel route according to the known travel demand again, it uses the neural network whose parameters are updated to calculate coordinates of candidate scenic spots, thereby selecting more suitable candidate scenic spots to generate a route meeting the travel demand better.

When the feedback value obtained by the deep learning model is maximized, the update of the neural network of the deep leaning model is completed, thereby obtaining the itinerary-planning model. When the feedback value satisfies a preset convergence requirement, it may be believed that the feedback value is maximized. The preset convergence requirement may include for example: feedback values obtained in preset times are equal, or a difference between feedback values obtained in preset times is smaller than or equal to a preset threshold. If the obtained feedback value is maximized, which indicates that the deep learning model can generate the most suitable travel route according to the known travel demand, the update of the neural network in the deep learning model is stopped, and the itinerary-planning model is obtained.

After the itinerary-planning model is obtained, personalized customization of the travel route can be performed according to the user-input travel demand.

FIG. 1 is a flow chart of a method of planning a travelling itinerary according to an embodiment of the present disclosure. As shown in FIG. 1, the method comprises:

In 101 is obtained the user's travel demand.

In this step, the user's travel demand comprises at least one of the user's travel destination, a travel comfort degree, a number of travelling days and a travel theme.

The travel destination represents the user's travel destination, for example Beijing or Shanghai. The number of travelling days represents a total number of days in which the user travels at the travel destination. The travel theme represents a theme of scenic spots to be visited by the user at the travel destination, for example, a travel theme of culture means that scenic spots to be visited by the user are culture-themed scenic spots. In the present disclosure, the travel theme may comprise one theme or more themes. The travel comfort degree represents the user's traveling time each day. For example, when the travel comfort degree is deep travel, this means that the user travels 10-12 hours each day; when the travel comfort degree is classical travel, this means that the user travels 8-10 hours each day; when the travel comfort degree is relaxing travel, this means that the user travels 6-8 hours each day.

It may be appreciated that in the present disclosure, setting is performed in advance for themes of different scenic spots in different cities and the travel time of respective scenic spots. For example, the theme of the Beijing-located Imperial Palace is preset as culture and history, and the travel time at the Imperial Palace is preset as 3 hours; the theme of the Huangpu River in Shanghai is preset as nature and the travel time at the scenic spot the Huangpu River is preset as 2 hours.

Optionally, in a specific implementation procedure of an embodiment of the present disclosure, the user's travel demand may be input by editing manually or by selecting an option, or input in a speech manner.

Figure 2:
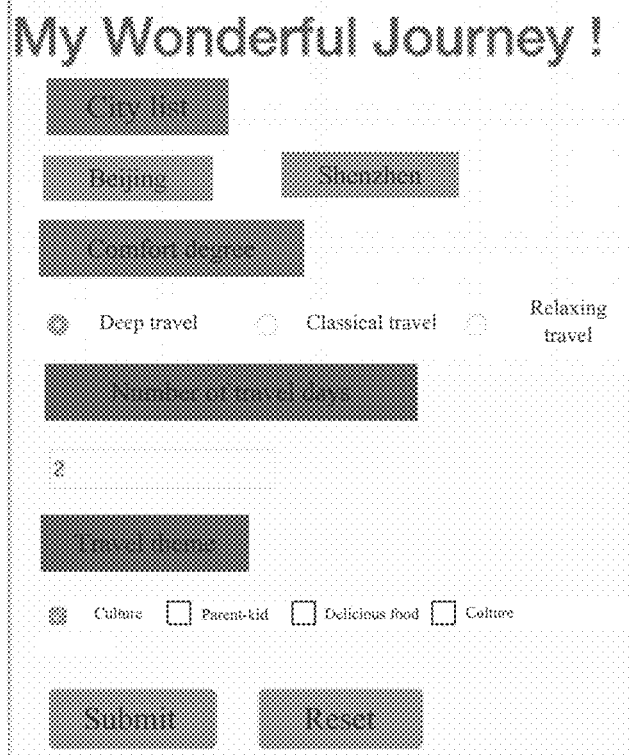
FIG. 2 is a schematic diagram of obtaining the user's travel demands according to an embodiment of the present disclosure.

For example, as shown in FIG. 2, an interface for inputting the travel demand may be provided to the user, and the user fills in the travel demand or selecting the travel demand on the input interface, thereby completing obtainment of the user's travel demand. As shown in FIG. 2, the user-input travel demand is: the travel destination is Beijing, the travel comfort degree is deep travel, the number of travelling days is 2 days, and the travel theme is culture and art.

102 relates to, according to the user's travel demand, obtaining a set of candidate scenic spots corresponding to the travel demand.

In this step, it is feasible to first determine candidate scenic spots meeting the travel demand according to the travel demand, and then, according to heat and scores of the candidate scenic spots, form the set of candidate scenic spots with candidate scenic spots meeting preset requirements.

As mentioned in the preceding text, it is believed by default that different scenic spots pre-include locations information and theme information of the scenic spots. It may also be appreciated that in the present disclosure, the scenic spots also pre-include heat information and score information corresponding to the scenic spots. After the user's travel demand is obtained, scenic spots satisfying the user's travel demand are regarded as candidate scenic spots. For example, if the user's travel demand is that the travel destination is Beijing and the travel theme is history, Beijing's scenic spots with the history theme are regarded as candidate scenic spots. Furthermore, according to the heat and scores of candidate scenic spots, candidate scenic spots meeting preset requirements form the set of candidate scenic spots. The preset requirements are already described above and will not be detailed any more here. For example, if the candidate scenic spots are the Imperial Palace, the Summer Palace and the Great Wall, and if the heat or score of the Great Wall is lower, only the Imperial Palace and the Summer Palace are selected to form the set of candidate scenic spots.

103 relates to inputting the user's travel demand and the set of candidate scenic spots into the itinerary-planning model, to obtain a travel route obtained by the itinerary-planning model.

In this step, the obtained user's travel demand and the set of candidate scenic spots obtained according to the user's travel demand are input into a duly-built itinerary-planning model, and it is the itinerary-planning model that plans the user's travel route, and thereby obtains the travel route satisfying the user's travel demand. The travel route obtained by the itinerary-planning model is pushed to the user. A starting time of each day's travel may be determined according to an actual scenario or the user's actual demand. For example, 8:00 am may be set by default as the starting time of each day's travel, or the starting time of the travel may be set according to the user's selection. In the travel route pushed to the user, it is feasible to further display map images including the scenic spots and pictures corresponding to the scenic spots to the user.

For example, as shown in FIG. 3, a display interface of the travel route may be provided to the user after the itinerary planning meeting the user's travel demand is completed. The display interface may include each day's travel route, map information of the travel route and picture information of scenic spots in the travel route. If the obtained user's travel demand is that the travel destination is Beijing, the travel comfort degree is deep travel, the number of travelling days is 2 days, and the travel theme is culture and art. If the travel routes obtained by the itinerary-planning model according to the user's travel demand are respectively: in the first day, 8:00 Imperial Palace→restaurant: Grandma's Diet (located at Beijing apm)→12:25 Jingshan Park→14:39 National Art Museum of China→18:05 Monument to the People's Heroes; in the second day: 8:00 Chairman Mao's Memorial Hall→10:05 the Great Hall of the People→restaurant: Charme (located Joy City)→12:05 the National Grand Theater→14:05 Tian'anmen Square→16:05Tian'anmen. The obtained travel routes, map information of the travel routes and picture information of scenic spots in the travel routes are displayed to the user in the display interface.

In the travel routes pushed to the user, detailed introduction of scenic spots may be set in names of the corresponding scenic spots, including the travel time at scenic spots, introduction of scenic spots and traffic conditions of scenic spots. The user may click the names of scenic spots in the travel route to acquire the detailed introduction of the scenic spots.

For example, as shown in FIG. 4, when the user clicks the name of the scenic spot in the travel route, an interface for displaying the detailed introduction of the scenic spot is provided to the user. If a scenic spot National Art Museum of China in the first day's travel route is clicked, an interface for displaying the detailed introduction of the scenic spot "National Art Museum of China" is provided to the user, for example, the travel time, a distance from a previous scenic spot, public transit stops and introduction of the scenic spot.

Figure 5:
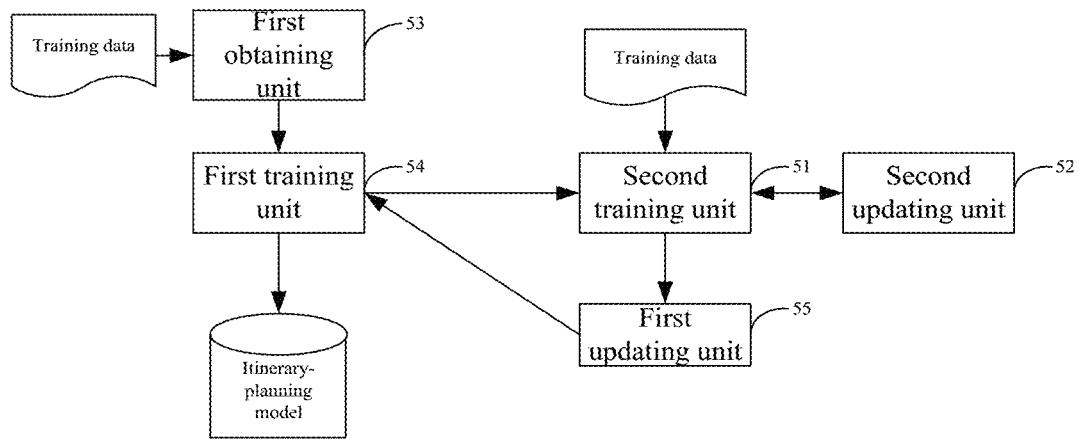
FIG. 5 is a structural schematic diagram of an apparatus for building an itinerary-planning model according to an embodiment of the present disclosure.

A structural schematic diagram of an apparatus for building an itinerary-planning model according to an embodiment of the present disclosure will be described below in detail. As shown in FIG. 5, the apparatus comprises: a second training unit 51, a second updating unit 52, a first obtaining unit 53, a first training unit 54 and a first updating unit 55.

The second training unit 51 is configured to pre-build a route estimating model in the following manner:

The second training unit 51 first obtains travel routes with known estimation scores and travel demands. The known estimation scores of the travel routes may be manually calibrated, or the known estimation scores of the travel routes may be automatically calibrated by using for example a deep learning method. In the present embodiment, the known estimation scores corresponding to the travel routes are at five levels, namely, level 0, level 1, level 2, level 3 and level 4. Level 0 to level 4 indicate that quality of the travel routes gets better in turn.

Then, the second training unit 51 extracts route features and travel demand features of the travel routes, and cascades the extracted route features and travel demands, and inputs cascaded features into a regression model. An output result obtained by the regression model according to the input cascaded features is a score corresponding to the travel route. The route features of the travel route comprise at least one of a route theme, route heat, travel time of the route or a distance of the route; the travel demand features comprise at least one of a travel destination, a travel comfort degree, a number of travelling days and a travel theme.

After the second training unit 51 obtains the score of the corresponding travel route, the regression model calculates a regression price, for example, calculates a root mean square error between the obtained score and the known estimation score of the travel route, and regards the root mean square error as the regression price.

The second updating unit 52 is configured to make it a training target of the regression model to minimize the regression price of the regression model.

That is, the second updating unit 52 adjusts parameters in the regression model according to the root mean square error obtained from the calculation, in order to minimize the root mean square error. In embodiments of the present disclosure, the second updating unit 52 constantly uses the regression price to adjust the parameters in the regression model until when the root mean square obtained from the calculation meets a preset convergence requirement, it may be believed that the minimization requirement of the regression price is reached, adjustment of the parameters of the regression model is completed, and the route estimating model is obtained. The preset convergence requirement may include: the root mean square errors obtained within preset times are equal, or a difference between the root mean square errors obtained within preset times is smaller than or equal to a preset threshold. The route estimating model is obtained upon completion of the training of the regression model. The route estimating model can estimate the travel route according to the travel demands.

The first obtaining unit 53 is configured to obtain a travel route with a known travel demand.

The first obtaining unit 53 obtains the travel route with the known travel demand from a database. The travel demand comprises at least one of a travel destination, a travel comfort degree, a number of travelling days and a travel theme. For example, the travel route: the Imperial Palace→Tian'anmen→the Great Hall of the People is obtained from the database, the travel demand corresponding to the travel route may be: the travel destination is Beijing, the travel them is history and culture, and the number of travelling days is one day.

The first training unit 54 is configured to train a deep learning model by regarding the user's travel demand, a set of candidate scenic spots determined by using the travel demand and the travel route corresponding to the travel demand as training samples, to obtain the itinerary-planning model.

Before training the deep learning model, the first training unit 54 first needs to determine the set of candidate scenic spots corresponding to the travel demand according to the obtained travel demand. Determining the set of candidate scenic spots corresponding to the travel demand comprises: determining candidate scenic spots meeting the travel demand according to the travel demand; according to heat and scores of the candidate scenic spots, forming the set of candidate scenic spots with candidate scenic spots meeting preset requirements. Upon determining candidate scenic spots meeting the travel demand according to the travel demand, it is feasible to match the travel demand with scenic spot attribute information in a scenic spot database, to obtain scenic spots meeting the travel demand as candidate scenic spots. In the scenic spot database, the scenic spot attribute information may include but not limited to: location information of the scenic spot, theme information of the scenic spot, and information about suitable travel time. Hence, the candidate scenic spots meeting the travel demand may be determined according to the obtained travel demand.

Forming the set of candidate scenic spots with candidate scenic spots meeting preset requirements may be forming the set of candidate scenic spots with candidate scenic spots whose heat or scores exceeds a preset threshold; or forming the set of candidate scenic spots with candidate scenic spots whose heat or scores rank top N, wherein N is an integer; or forming the set of candidate scenic spots with those candidate scenic spots who meet preset requirements after heat and scores of candidate scenic spots are considered comprehensively. It may be appreciated that in the present disclosure, the scenic spot database may pre-include heat information and score information corresponding to scenic spots. It is also feasible to obtain heat information and score information corresponding to scenic spots in other ways, for example, obtain the heat information and score information corresponding to scenic spots from a commentary-type server. For example, if the obtained user travel demand is: the travel destination is Beijing and the travel them is history and culture, the obtained candidate scenic spots are cultural scenic spots located in Beijing such as the Imperial Palace, the Great Wall and the National Grand Theater. If the Great Wall in the candidate scenic spots has a lower heat or score, only the Imperial Palace and the National Grand Theater are used to form the set of candidate scenic spots corresponding to the user's travel demand.

Optionally, in a specific implementation mode of the present embodiment, the set of candidate scenic spots may further be obtained in the following manner: according to the travel destination in the user's travel demand, determining the set of candidate scenic spots corresponding to the travel destination, and recording the set as a candidate set of scenic spots of the travel destination; then according to a travel theme in the user's travel demand, determining a set of candidate scenic spots corresponding to the travel them, and recording the set as a candidate set of initial travel scenic spots. Scenic spots in the set of initial travel scenic spots as starting scenic spots, and then other scenic spots are selected from the candidate set of scenic spots of the travel destination, to generate the travel route.

After the set of candidate scenic spots is obtained, a travel information graph is built by using the travel demand and the set of candidate scenic spots, wherein the travel information graph includes at least one of a scenic spot location information graph, an information graph about whether scenic spots are sightseen, and an overlapping information graph of scenic spots at the same location. The travel information included by different travel information graphs is different. For example, the scenic spot location information graph includes locational or coordinate information of scenic spots; the information graph about whether scenic spots are sightseen includes information about whether the scenic spots are already sightseen.

Finally, the first training unit 54 trains the deep model by using the travel demand, the travel information graph and the travel route as training samples, to obtain the itinerary-planning model.

Wherein a process of training the deep learning model by the first training unit 54 is in fact a self-learning process of the deep learning model. The principle of self-learning of the deep learning model is described below:

After the building of the travel information graph is completed, the first training unit 54 performs convolution for the built travel information graph so as to extract features in the travel information graph.

Then, the first training unit 54 extracts route features of a travel route from an initial travel scenic spot to a current travel scenic spot, and cascades the extracted route features with a convolution result of the travel information graph, as an input of a fully-connected layer of the deep learning model. However, an output of the fully-connected layer of the deep learning model is a coordinate of next possible travel scenic spot. Since generation of the travel route with the deep learning model used in the present disclosure is completed selecting suitable candidate scenic spots step by step in the set of candidate scenic spots, it is necessary to constantly select next suitable candidate scenic spot according to the already-generated route, to generate a complete travel route, and stop selection until the generated travel route satisfies the user's travel demand.

After obtaining the coordinate of next possible travel scenic spot, the first training unit 54 regards coordinates of candidate scenic spots as input via a neural network, and then selects next travel scenic spot according to an output result of the neural network. For example, the neural network used by the first training unit 54 is a convolutional neural network Q-network, Q values obtained by calculating by the Q-network according to coordinates of candidate scenic spots are output results corresponding to coordinates of respective candidate scenic spots, and a candidate scenic spot corresponding to the coordinate with a maximum Q value is selected therefrom as next travel scenic spot. After selecting next travel scenic spot, the first training unit 54 updates the travel information graph about whether scenic spots are sightseen among the travel information graphs. A purpose of executing the process is filtering already-selected candidate scenic spots from the set of travel candidate scenic spots.

The first training unit 54 repeats the above step until the travel time of scenic spots in the generated travel route meets the user travel demand, i.e., the generated route is regarded as a complete travel route after a sum of travel time of scenic spots in the generated travel route satisfies the travel time of each traveling day of the user.

The second updating unit 55 is configured to make it a training target of the deep learning model to maximize a feedback value of the deep learning model.

The first training unit 54 extracts route features and travel demand features of the generated travel route, and inputs a cascading result of the two into the route estimating model. The route estimating model outputs a score corresponding to the travel route according to the input cascading result. The route estimating model, after obtaining the score corresponding to the travel route, feeds back the obtained score to the second updating unit 55 as a feedback value. The second updating unit 55 updates the parameters of the neural network according to the feedback value. When the first training unit 54 generates the travel route according to the known travel demand again, it uses the neural network whose parameters are updated to calculate coordinates of candidate scenic spots, thereby selecting more suitable candidate scenic spots to generate a route meeting the travel demand better.

When the feedback value obtained by the second updating unit 55 is maximized, the update of the first training unit 54 is completed, thereby obtaining the itinerary-planning model. When the feedback value obtained by the second updating unit 55 satisfies a preset convergence requirement, it may be believed that the feedback value is maximized. The preset convergence requirement may include for example: feedback values obtained in preset times are equal, or a difference between feedback values obtained in preset times is smaller than or equal to a preset threshold. If the feedback value obtained by the second updating unit 55 is maximized, which indicates that the first training unit 54 can generate the most suitable travel route according to the known travel demand, the update of the neural network in the deep learning model is stopped, and the itinerary-planning model is obtained.

Figure 6:
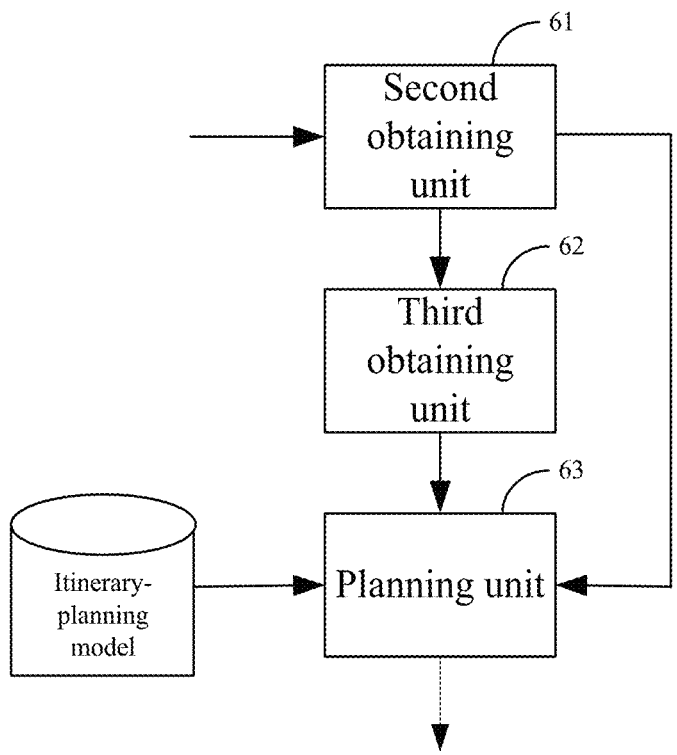
FIG. 6 is a structural schematic diagram of an apparatus for planning a traveling itinerary according to an embodiment of the present disclosure.

FIG. 6 is a structural schematic diagram of an apparatus for planning a traveling itinerary according to an embodiment of the present disclosure. As shown in FIG. 6, the apparatus comprises: a second obtaining unit 61, a third obtaining unit 62 and a planning unit 63.

The second obtaining unit 61 is configured to obtain the user's travel demand.

The user's travel demand obtained by the second obtaining unit 61 comprises at least one of the user's travel destination, a travel comfort degree, a number of travelling days and a travel theme.

The travel destination represents the user's travel destination, for example Beijing or Shanghai. The number of travelling days represents a total number of days in which the user travels at the travel destination. The travel theme represents a theme of scenic spots to be visited by the user at the travel destination, for example, a travel theme of culture means that scenic spots to be visited by the user are culture-themed scenic spots. In the present disclosure, the travel theme may comprise one theme or more themes. The travel comfort degree represents the user's traveling time each day. For example, when the travel comfort degree is deep travel, this means that the user travels 10-12 hours each day; when the travel comfort degree is classical travel, this means that the user travels 8-10 hours each day; when the travel comfort degree is relaxing travel, this means that the user travels 6-8 hours each day.

It may be appreciated that in the present disclosure, setting is performed in advance for themes of different scenic spots in different cities and the travel time of respective scenic spots. For example, the theme of the Beijing-located Imperial Palace is preset as culture and history, and the travel time at the Imperial Palace is preset as 3 hours; the theme of the Huangpu River in Shanghai is preset as nature, and the travel time at the scenic spot the Huangpu River is preset as 2 hours.

Optionally, in a specific implementation procedure of an embodiment of the present disclosure, the user's travel demand may be input by editing manually or by selecting an option, or input in a speech manner.

The third obtaining unit 62 is configured to, according to the user's travel demand, obtain a set of candidate scenic spots corresponding to the travel demand.

The third obtaining unit 62 first determines candidate scenic spots meeting the travel demand according to the travel demand, and then, according to heat and scores of the candidate scenic spots, forms the set of candidate scenic spots with candidate scenic spots meeting preset requirements.

As mentioned in the preceding text, themes of different scenic spots are already preset. It may also be appreciated that in the present disclosure, heat information and score information of the scenic spots are preset. After obtaining the user's travel demand, the third obtaining unit 62 regards scenic spots satisfying the user's travel demand as candidate scenic spots. Furthermore, the third obtaining unit 62, according to the heat and scores of candidate scenic spots, enables candidate scenic spots meeting preset requirements to form the set of candidate scenic spots. The preset requirements are already described above and will not be detailed any more here.

The planning unit 63 is configured to input the user's travel demand and the set of candidate scenic spots into the itinerary-planning model, to obtain a travel route obtained by the itinerary-planning model.

The planning unit 63 inputs the obtained user's travel demand and the set of candidate scenic spots obtained according to the user's travel demand into the duly-built itinerary-planning model, and it is the itinerary-planning model that plans the user's travel route, and thereby obtains the travel route satisfying the user's travel demand.

After obtaining the duly-planned travel route, the planning unit 63 pushes the travel route to the user. The planning unit 63 may determine a starting time of each day's travel according to an actual scenario or the user's actual demand. For example, the planning unit 63 may set 8:00 am by default as the starting time of each day's travel, or the planning unit 63 may set the starting time of the travel according to the user's selection. In the travel route pushed to the user, the planning unit 63 may further display map images including the scenic spots and pictures corresponding to the scenic spots to the user.

In the travel route pushed to the user, the planning unit 63 may further set detailed introduction of scenic spots in names of the corresponding scenic spots, including the travel time at scenic spots, introduction of scenic spots and traffic conditions of scenic spots. The user may click the names of scenic spots in the travel route to acquire the detailed introduction of the scenic spots.

Figure 7:
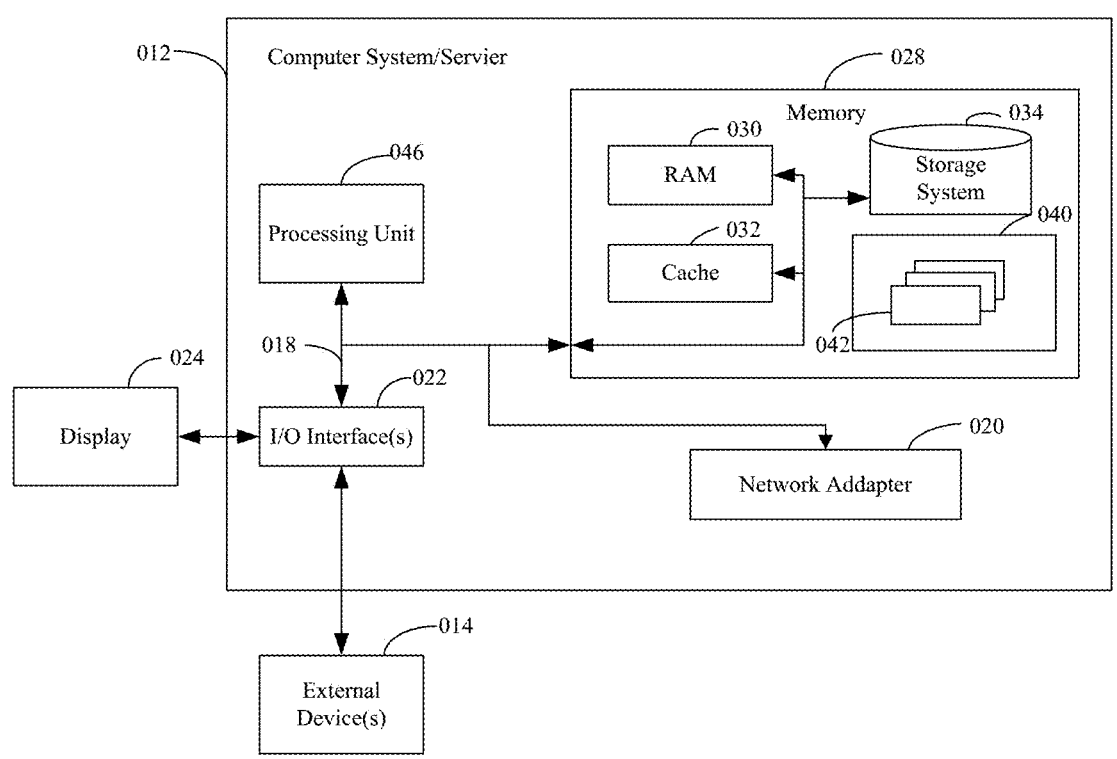
FIG. 7 is a block diagram of a computer system/server according to an embodiment of the present disclosure.

FIG. 7 illustrates a block diagram of an example computer system/server 012 adapted to implement an implementation mode of the present disclosure. The computer system/server 012 shown in FIG. 7 is only an example and should not bring about any limitation to the function and scope of use of the embodiments of the present disclosure.

As shown in FIG. 7, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the method of building an itinerary-planning model, which may comprise:

obtaining a travel route with a known travel demand;

training a deep learning model by regarding the user's travel demand, a set of candidate scenic spots determined by using the travel demand and the travel route corresponding to the travel demand as training samples, to obtain an itinerary-planning model;

the itinerary-planning model is configured to obtain a corresponding travel route by using the travel demand.

Or, for example, implement a method of planning a traveling itinerary, which may comprise:

obtaining the user's travel demand;

according to the user's travel demand, obtaining a set of candidate scenic spots corresponding to the travel demand;

inputting the user's travel demand and the set of candidate scenic spots into the itinerary-planning model, to obtain a travel route obtained by the itinerary-planning model.

The above-mentioned computer program may be set in a computer storage medium, i.e., the computer storage medium is encoded with a computer program. When the program is executed by one or more computers, enables said one or more computers to execute steps of methods and/or operations of apparatuses as shown in the above embodiments of the present disclosure. For example, steps of methods executed by said one or more processors may include:

obtaining a travel route with a known travel demand;

training a deep learning model by regarding the user's travel demand, a set of candidate scenic spots determined by using the travel demand and the travel route corresponding to the travel demand as training samples, to obtain an itinerary-planning model;

the itinerary-planning model is configured to obtain a corresponding travel route by using the travel demand.

Or, may further comprise:

obtaining the user's travel demand;

according to the user's travel demand, obtaining a set of candidate scenic spots corresponding to the travel demand;

inputting the user's travel demand and the set of candidate scenic spots into the itinerary-planning model, to obtain a travel route obtained by the itinerary-planning model.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof. Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

According to the technical solutions provided by the present disclosure, it is possible to, through the pre-built itinerary-planning model, smartly generate the travel route according to the user's travel demand, thereby reduce the time spent by the user in planning the travelling itinerary, and improve the user's efficiency of planning the travelling itinerary.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for itinerary-planning, wherein the method comprises:
    obtaining a travel demand of a user;
    obtaining a travel route for the user according to the travel demand of the user by using an itinerary-planning model; and
    displaying the travel route for the user;
    wherein the itinerary-planning model is obtained by:
        obtaining a travel route with a known travel demand; and
        training a deep learning model by regarding the known travel demand, a set of candidate scenic spots determined by using the known travel demand and the travel route corresponding to the known travel demand as training samples, to obtain the itinerary-planning model,
    wherein a training target of the deep learning model is to maximize a feedback value of the deep learning model, and the feedback value is an estimation score obtained by using a route estimating model to estimate a travel route obtained by the deep learning model.

2. The method according to claim 1, wherein the determining a set of candidate scenic spots by using the travel demand comprises:
    according to the obtained travel demand, determining candidate scenic spots meeting the travel demand;
    according to heat and scores of the candidate scenic spots, forming a set of candidate scenic spots with candidate scenic spots meeting preset requirements;
    wherein the candidate scenic spots include: attribute information of a scenic spot, and the attribute information of a scenic spot comprises at least one of scenic spot location information, scenic spot theme information, and scenic spot travel time information.

3. The method according to claim 1, wherein the regarding the travel demand, a set of candidate scenic spots determined by using the travel demand and the travel route corresponding to the travel demand as training samples comprises:
    building a travel information graph by using the travel demand and the set of candidate scenic spots;
    regarding the travel demand, the travel information graph and the travel route as the training samples;
    wherein the travel information graph includes:
        at least one of a scenic spot location information graph, an information graph about whether scenic spots are sightseen, and an overlapping information graph of scenic spots at the same location.

4. The method according to claim 1, wherein the travel demand comprises at least one of a travel destination, a travel comfort degree, a number of travel days and a travel theme.

5. The method according to claim 1, wherein the route estimating model is built in the following manner:
    obtaining travel routes with known estimation scores and travel demands;
    training a regression model by regarding route features, travel demand features and estimation scores of the travel routes as training samples, to obtain the route estimating model; wherein the route features of the travel route comprise at least one of a route theme, route heat, travel time of the route or a distance of the route;
    the route estimating mode is configured to estimate a travel route according to a travel demand.

6. The method according to claim 5, wherein the method further comprises:
    a training target of the regression model is to minimize a regression price of the regression model;
    the regression price is a root mean square error between a score obtained by the regression model and corresponding to the travel route and a known estimation score of the travel route.

7. The method according to claim 1, wherein the method further comprises:
    obtaining a user's travel demand;
    according to the user's travel demand, obtaining a set of candidate scenic spots corresponding to the travel demand;
    inputting the user's travel demand and the set of candidate scenic spots into the itinerary-planning model, to obtain a travel route obtained by the itinerary-planning model.

8. A device, wherein the device comprises:
    one or more processor;
    a memory for storing one or more programs,
    said one or more programs, when executed by said one or more processors, enable said one or more processors to implement the following operation:
    obtaining a travel demand of a user;
    obtaining a travel route for the user according to the travel demand of the user by using an itinerary-planning model; and
    displaying the travel route for the user;
    wherein the itinerary-planning model is obtained by:
        obtaining a travel route with a known travel demand; and
        training a deep learning model by regarding the known travel demand, a set of candidate scenic spots determined by using the known travel demand and the travel route corresponding to the known travel demand as training samples, to obtain the itinerary-planning model, wherein a training target of the deep learning model is to maximize a feedback value of the deep learning model, and the feedback value is an estimation score obtained by using a route estimating model to estimate a travel route obtained by the deep learning model.

9. The device according to claim 8, wherein the determining a set of candidate scenic spots by using the travel demand comprises:
    according to the obtained travel demand, determining candidate scenic spots meeting the travel demand;
    according to heat and scores of the candidate scenic spots, forming a set of candidate scenic spots with candidate scenic spots meeting preset requirements;
    wherein the candidate scenic spots include: attribute information of a scenic spot, and the attribute information of a scenic spot comprises at least one of scenic spot location information, scenic spot theme information, and scenic spot travel time information.

10. The device according to claim 8, wherein the regarding the travel demand, a set of candidate scenic spots determined by using the travel demand and the travel route corresponding to the travel demand as training samples comprises:
    building a travel information graph by using the travel demand and the set of candidate scenic spots;
    regarding the travel demand, the travel information graph and the travel route as the training samples;
    wherein the travel information graph includes:
    at least one of a scenic spot location information graph, an information graph about whether scenic spots are sightseen, and an overlapping information graph of scenic spots at the same location.

11. The device according to claim 8, wherein the travel demand comprises at least one of a travel destination, a travel comfort degree, a number of travel days and a travel theme.

12. The device according to claim 8, wherein the route estimating model is built in the following manner:
    obtaining travel routes with known estimation scores and travel demands;
    training a regression model by regarding route features, travel demand features and estimation scores of the travel routes as training samples, to obtain the route estimating model; wherein the route features of the travel route comprise at least one of a route theme, route heat, travel time of the route or a distance of the route;
    the route estimating mode is configured to estimate a travel route according to a travel demand.

13. The device according to claim 12, wherein the operation further comprises:
    a training target of the regression model is to minimize a regression price of the regression model;
    the regression price is a root mean square error between a score obtained by the regression model and corresponding to the travel route and a known estimation score of the travel route.

14. The device according to claim 8, wherein the operation further comprises:
    obtaining a user's travel demand;
    according to the user's travel demand, obtaining a set of candidate scenic spots corresponding to the travel demand;
    inputting the user's travel demand and the set of candidate scenic spots into the itinerary-planning model, to obtain a travel route obtained by the itinerary-planning model.

15. A non-transitory storage medium including computer-executable instructions which, when executed by a computer processor, execute the following operation:
    obtaining a travel demand of a user;
    obtaining a travel route for the user according to the travel demand of the user by using an itinerary-planning model; and
    displaying the travel route for the user;
    wherein the itinerary-planning model is obtained by:
        obtaining a travel route with a known travel demand; and
        training a deep learning model by regarding the known travel demand, a set of candidate scenic spots determined by using the known travel demand and the travel route corresponding to the known travel demand as training samples, to obtain the itinerary-planning model,
    wherein a training target of the deep learning model is to maximize a feedback value of the deep learning model, and the feedback value is an estimation score obtained by using a route estimating model to estimate a travel route obtained by the deep learning model.

16. The non-transitory storage medium according to claim 15, wherein the determining a set of candidate scenic spots by using the travel demand comprises:
    according to the obtained travel demand, determining candidate scenic spots meeting the travel demand;
    according to heat and scores of the candidate scenic spots, forming a set of candidate scenic spots with candidate scenic spots meeting preset requirements;
    wherein the candidate scenic spots include: attribute information of a scenic spot, and the attribute information of a scenic spot comprises at least one of scenic spot location information, scenic spot theme information, and scenic spot travel time information.

17. The non-transitory storage medium according to claim 15, wherein the regarding the travel demand, a set of candidate scenic spots determined by using the travel demand and the travel route corresponding to the travel demand as training samples comprises:
    building a travel information graph by using the travel demand and the set of candidate scenic spots;
    regarding the travel demand, the travel information graph and the travel route as the training samples;
    wherein the travel information graph includes:
    at least one of a scenic spot location information graph, an information graph about whether scenic spots are sightseen, and an overlapping information graph of scenic spots at the same location.

18. The non-transitory storage medium according to claim 15, wherein the travel demand comprises at least one of a travel destination, a travel comfort degree, a number of travel days and a travel theme.

19. The non-transitory storage medium according to claim 15, wherein the route estimating model is built in the following manner:
    obtaining travel routes with known estimation scores and travel demands;
    training a regression model by regarding route features, travel demand features and estimation scores of the travel routes as training samples, to obtain the route estimating model;
    wherein the route features of the travel route comprise at least one of a route theme, route heat, travel time of the route or a distance of the route;
    the route estimating mode is configured to estimate a travel route according to a travel demand.

20. The non-transitory storage medium according to claim 19, wherein the operation further comprises:
    a training target of the regression model is to minimize a regression price of the regression model;
    the regression price is a root mean square error between a score obtained by the regression model and corresponding to the travel route and a known estimation score of the travel route.

21. The non-transitory storage medium according to claim 15, wherein the operation further comprises:
    obtaining a user's travel demand;
    according to the user's travel demand, obtaining a set of candidate scenic spots corresponding to the travel demand;

inputting the user's travel demand and the set of candidate scenic spots into the itinerary-planning model, to obtain a travel route obtained by the itinerary-planning model.

\* \* \* \* \*